(12) United States Patent
Stolarz, Jr. et al.

(10) Patent No.: US 9,221,989 B2
(45) Date of Patent: Dec. 29, 2015

(54) TAMPER EVIDENT DOCUMENTS AND INKS

(71) Applicant: P.H. GLATFELTER COMPANY, York, PA (US)

(72) Inventors: John W. Stolarz, Jr., Circleville, OH (US); William N. Justice, Waverly, OH (US); James Gregory Lovensheimer, Chillicothe, OH (US)

(73) Assignee: P.H. Glatfelter Company, York, PA (US)

( * ) Notice: Subject to any disclaimer, the term of this patent is extended or adjusted under 35 U.S.C. 154(b) by 58 days.

(21) Appl. No.: 14/011,952

(22) Filed: Aug. 28, 2013

(65) Prior Publication Data

US 2015/0064419 A1    Mar. 5, 2015

(51) Int. Cl.

| | | |
|---|---|---|
| *B41M 3/14* | (2006.01) |
| *B41M 5/136* | (2006.01) |
| *B41M 5/155* | (2006.01) |
| *B41M 5/165* | (2006.01) |
| *B42D 15/00* | (2006.01) |
| *C09D 11/50* | (2014.01) |
| *B42D 25/378* | (2014.01) |
| *C09D 11/102* | (2014.01) |
| *B41M 5/124* | (2006.01) |

(52) U.S. Cl.
CPC .............. *C09D 11/50* (2013.01); *B41M 5/136* (2013.01); *B41M 5/155* (2013.01); *B42D 15/00* (2013.01); *B42D 25/378* (2014.10); *C09D 11/102* (2013.01); *B41M 3/142* (2013.01); *B41M 5/124* (2013.01); *B41M 5/165* (2013.01); *B42D 2033/12* (2013.01)

(58) Field of Classification Search
CPC ........ B41M 3/14; B41M 3/142; B41M 5/136; B41M 5/155; B41M 5/165; B41M 4/14; B41M 4/142; B42D 15/00; B42D 2033/12; C09D 11/00
USPC ................. 503/215; 106/31.16, 31.14, 31.26; 283/95; 427/150
See application file for complete search history.

(56) References Cited

U.S. PATENT DOCUMENTS

| | | | |
|---|---|---|---|
| 4,662,651 A | 5/1987 | Mowry, Jr. | |
| 5,401,060 A | 3/1995 | Chang et al. | |
| 6,020,066 A * | 2/2000 | Weisser et al. | 428/402.21 |
| 2007/0244219 A1 * | 10/2007 | Vaidya et al. | 523/160 |
| 2015/0037565 A1 * | 2/2015 | Stolarz et al. | 428/327 |

* cited by examiner

*Primary Examiner* — Bruce H Hess
(74) *Attorney, Agent, or Firm* — Dickstein Shapiro LLP

(57) ABSTRACT

A tamper evident document, a process of preparing the tamper evident document, and a tamper evident ink. The tamper evident document includes a paper substrate having a face for providing information, and a tamper evident ink applied on the face of the paper substrate. The tamper evident ink includes (i) microcapsules having a cross-linked polymer shell and a core surrounded by the shell; and (ii) developer particles. The cores of the microcapsules include at least one color former dissolved in a carrier oil. If information on the tamper evident document is altered by force or pressure (e.g., by scraping with a knife), the microcapsules rupture and the color former reacts with the developer particles to provide a visual indication of tampering (e.g., appearance of color or color change) on the face of the document.

24 Claims, 5 Drawing Sheets

TAMPER EVIDENT DOCUMENTS AND INKS

TECHNICAL FIELD

The present invention relates generally to specialized inks, and more particularly, to tamper evident inks that are applied to the face of documents, which indicate if tampering or forgery has occurred to the document.

BACKGROUND OF THE INVENTION

A problem which is currently strongly felt in various fields reliant on the security of documents, and most of all in the case of checks, is the one related to the possibility of detecting or preventing forgery of the document, such as the fraudulent alteration of the amounts written on a check or the name of the recipient on the check.

Any document that represents value, particularly banknotes and checks, requires particular measures that are aimed specifically at preventing its counterfeiting and forgery by ill-intentioned individuals. The problem is particularly felt in relation to the alteration of checks for which a high level of security is required. Many checks are produced with solutions suitable to make them difficult to alter or reproduce. For example, checks may include watermarked paper that displays symbols or figures imprinted so that they are visible only if held up to the light, a silver-coated thread that is usually arranged vertically, holograms, and so forth.

Unfortunately, the forgery or alteration of business checks is relatively easy. Business checks are often printed in two printing steps. The first prints on a generic design with some security features to make a blank check. The second printing step can add the specific data like check amount, payee, date, etc. The second printing step is usually performed using a dry toner and is heat fused to the paper on a laser printer. These are often network printers or modified copiers. Forgery can be accomplished by using a knife to pick the fused toner off of the check and then re-printing the check with new payees, dates, or amounts, for example. There remains a need for detecting if a check has been tampered with and potentially forged. The same problems apply to all value-bearing documents, such as banknotes, identity documents, tickets, and so forth. The concept of the present invention is to provide for the appearance of a mark or colored blemish on the document where the alteration or forgery has occurred (e.g., by the application of pressure from a knife in scraping off the fused toner or ink).

One industry in the art, known for reproducing marks, is the concept of carbonless papers. Carbonless impact marking papers or carbonless copy papers are typically used for the transfer of images. These carbonless papers are capable of producing an image upon application of pressure. Products employing this chemistry generally contain at least two substrates (for example, two sheets of paper) and involve coating one reactant, known as a color former, on one substrate, and the other reactant, known as a developer, on another "mating" substrate. When a pressure (e.g., the force of writing) is applied to the first substrate, a copy of the writing is developed on the second substrate. Carbonless paper is often used for printed form-sets for preparing multiple copies of receipts, bills, and other business forms. It is not believed that this type of carbonless paper technology has been applied or used with a single substrate (for example, a single document) in order to detect alteration or forgery of a document. In addition, the carbonless paper technology requires a very small amount of pressure (e.g., the pressure applied from a pen during writing) to cause the marks to develop on the second substrate. It is desirous to have a system where a relatively high amount of pressure (e.g., the pressure from a knife scraping off the printed subject matter) causes the marks to develop or appear.

SUMMARY OF THE INVENTION

To overcome these and other drawbacks, the present invention provides a tamper evident document, which uses a tamper evident ink applied to the face of the document. If information (e.g., variable or sensitive information) on the tamper evident document is altered by force or pressure (e.g., by scraping with a knife), a visual indication of tampering is revealed on the face of the document. The visual indication of tampering may include the appearance of color, such as an orange color, or a color change. If the information is not tampered with (e.g., the document is merely subjected to standard handling and printing), then there is no indication of any type of tampering with the document (e.g., the document remains unchanged). Unlike carbonless paper, the tamper evident document only requires a single paper substrate. In other words, the tamper evident document does not use or require two separate or multiple sheets of paper. The tamper evident document also requires a relatively high amount of pressure (e.g., the pressure from a knife scraping off the printed subject matter) to cause the mark to develop or appear as contrasted to the small degree of pressure (e.g., caused by writing with a pen) needed in carbonless paper technology.

According to one embodiment, the present invention provides a tamper evident document including a paper substrate having a face for providing information, and a tamper evident ink applied on the face of the paper substrate. The tamper evident ink includes a two-part security ink chemistry including at least (i) microcapsules having a cross-linked polymer shell and a core surrounded by the shell; and (ii) developer particles. The cores of the microcapsules include at least one color former dissolved in a carrier oil.

The tamper evident ink includes microcapsules having a cross-linked polymer shell and a core surrounded by the shell. The cross-linked polymer shell may be comprised of a polyurea. The core surrounded by the polymer shell may be comprised of color former dissolved in a carrier oil. The color former may include leuco dyes, for example. The carrier oil may include a vegetable oil, soybean oil, or the like. In one embodiment, the tamper evident ink may contain about 15-25% by weight of the microcapsules.

The microcapsules are preferably of a size and thickness designed to remain intact under the normal handling and wear of the document (e.g., writing on the face of the document, printing on the document, etc.), but able to easily rupture when a force is applied to the microcapsules (e.g., by scraping with a forger's knife). As an example, microcapsules having a diameter of about 2-8 microns, and in particular, about 5 microns, and having a wall thickness of about 110-120 nanometers tend to exhibit a sufficient rupture strength to allow for the microcapsules to remain intact during writing, printing and normal handling, but which rupture when a severe force, such as scraping by a knife, is applied to the document.

The ink further includes developer particles. The developer particles may include any developers capable of reacting with the color former inside the microcapsules, if released by rupturing the microcapsule, to produce a color image. For example, the developer may include a phenolic resin, such as a zincated phenolic resin. In one embodiment, the tamper evident ink may contain about 15-20% by weight of the developer particles.

The tamper evident ink may further include about 20-40% by weight ester resin; and about 20-30% by weight oil. The tamper evident ink may be colorless or colored, but is preferably colorless when in an unreacted state (i.e., so long as the at least one color former is not in contact with the developer particles).

As one embodiment, the tamper evident ink may include (a) about 15-25% by weight microcapsules having a cross-linked polyurea shell and a core surrounded by the shell, wherein the core comprises at least one color former dissolved in a carrier oil; (b) about 15-20% by weight developer particles; (c) about 20-40% by weight ester resin; and (d) about 20-30% by weight oil.

According to another embodiment, a process of preparing a tamper evident document includes (a) providing a paper substrate having a face for providing information; and (b) applying a tamper evident ink on the face of the paper substrate, the tamper evident ink comprising: (i) microcapsules having a cross-linked polymer shell and a core surrounded by the shell, wherein the core comprises at least one color former dissolved in a carrier oil; and (ii) developer particles. The tamper evident ink may be applied to portions of the paper substrate which will contain variable or sensitive information (e.g., name or amount on a check). The variable or sensitive information may be printed on the face of the paper substrate in the places where the tamper evident ink has previously been printed. The tamper evident ink may be applied by coating or printing the tamper evident ink onto the face of the paper substrate. For example, the tamper evident ink may applied by dry offset printing.

If any information on the tamper evident document is altered by force or pressure (e.g., by scraping with a knife), the microcapsules rupture and the color former reacts with the developer particles to provide a visual indication of tampering on the face of the document. The visual indication may include a color change or appearance of color (e.g., an orange color) where the force or pressure was applied. If the information is not tampered with, then the microcapsules remain intact and do not rupture under the normal pressures and stresses endured by the paper (e.g., standard handling and printing). Therefore, the microcapsules remain undetected, and there is no indication of any type of tampering with the document.

The tamper evident document may include security documents or other documents, which if altered would severely undermine or negate the value of the document. Documents of particular concern and susceptible to forgery or alteration include checks, bank notes, lottery tickets, passports, gaming and casino documents, sports cards, tickets, and the like.

It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
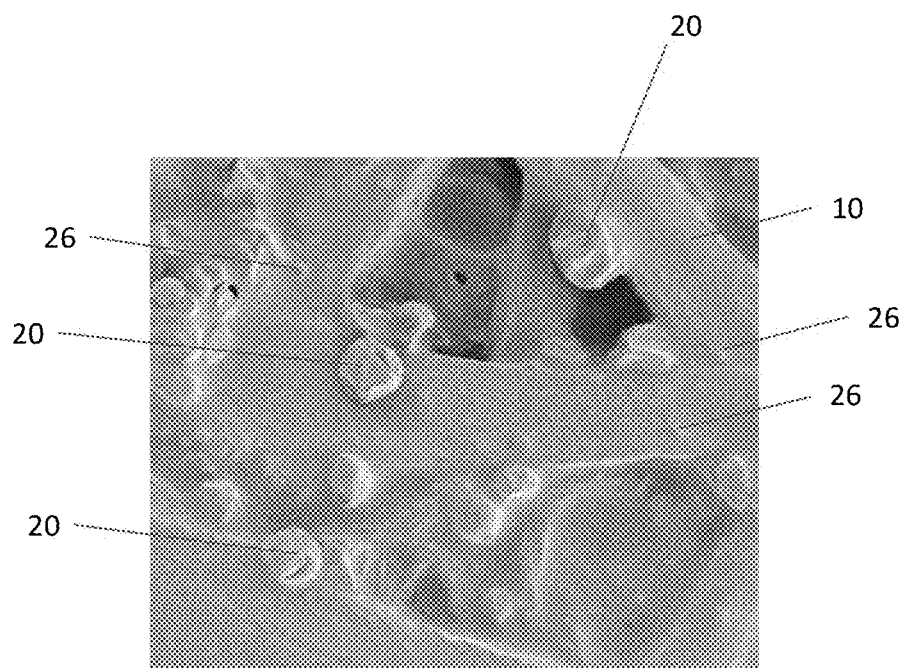
FIG. 1 shows a scanning electron microscope image at 1000× magnification of a paper substrate with the tamper evident ink including microcapsules containing a color former and developer particles printed thereon.

The present invention provides a tamper evident ink, a document with the tamper evident ink applied to a surface, and a process of making the tamper evident document. The tamper evident document indicates tampering or alteration of the document on the face of the document. When the tamper evident document is subjected to a high degree of pressure or force (e.g., the force from a knife scraping off the printed subject matter), a mark develops or appears on the face of the document. The mark is a clear visual indication of tampering, and may include the appearance of color, such as an orange color, which was not previously present on the document. If the information is not tampered with (e.g., the document is merely subjected to standard handling and printing), then there is no indication of any type of tampering with the document. In other words, the document remains unchanged, the microcapsules remain undetected, and an unknowing user would have no knowledge of the presence of the tamper evident ink on the document.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of." Unless specified otherwise, all values provided herein include up to and including the endpoints given, and the values of the constituents or components of the compositions are expressed in weight percent or % by weight of each ingredient in the composition.

Tamper Evident Ink

The tamper evident ink provides a two-part security ink chemistry in a single formulation. In particular, the tamper evident ink includes (i) microcapsules having a cross-linked polymer shell and a core surrounded by the shell; and (ii) developer particles. The cores of the microcapsules include at least one color former dissolved in a carrier oil. If the microcapsules rupture, the core material including the color former is released, the carrier oil flows, allowing the color former to interact and react with the developer particles to provide a permanent, irreversible, colored mark. This colored mark provides a visual cue that the document has been altered or modified near or at the location of the colored mark. If the microcapsules remain intact and do not rupture, then no color change occurs, and the document containing the tamper evident ink remains unchanged.

(i) Microcapsules

The first part of the tamper evident ink includes microcapsules having a cross-linked polymer shell and a core surrounded by the shell. The microcapsules may be formed by microencapsulation. Microencapsulation is a process in which tiny particles or droplets are surrounded by a coating to create small capsules around the droplets. Thus, in a relatively simplistic form, a microcapsule is a small sphere with a uniform wall around it. The substance that is encapsulated may be called the core material, the active ingredient or agent, fill, payload, nucleus, or internal phase. Substances may be microencapsulated with the intention that the core material be confined within capsule walls unless certain external conditions trigger the capsule walls to rupture, break, or the like, as in the case here when a pressure or force is applied to rupture the capsules. The material encapsulating the core is referred to as the coating, membrane, encapsulation layer, shell, or wall material. Microcapsules may have one wall or multiple shells arranged in strata of varying thicknesses around the core.

A number of microencapsulation techniques known to those skilled in the art (e.g., interfacial polymerization, "in situ" polymerization, coacervation, etc.) can be employed to form an encapsulation layer or shell around the color former composition thereby creating a core where the color former resides. The selection of the technique and shell material depends on the final application of the product, considering physical and chemical stability, concentration, desired particle size, release mechanism, and manufacturing costs. As an example, a cross-linking polymerization reaction between a cross-linkable component and an activator compound is employed in an emulsion environment. Interfacial cross-linking polymerization techniques well known to those skilled in the art are particularly preferred in the present invention. Such systems include gelatin, formaldehyde systems (phenol-formaldehyde or melamine-formaldehyde resins) and polyurethane-urea systems. Polyurethane-urea systems may be useful for encapsulating the color former compositions according to the present invention. Preferred polyurethane-urea systems according to the present invention include, for example, the reaction of diisocyanates such as, for example, hexamethylene diisocyanate with a cross-linking activator compound such as, for example, polyamines like guanidene carbonate or diethyltriamine. A preferred microencapsulation procedure is disclosed by Rodrigues et al., *Microencapsulation of Limonene for Textile Application, Ind. Eng. Chem. Res.,* 2008, 47, 4142-4147, which is incorporated herein by reference in its entirety. Another preferred microencapsulation procedure is disclosed in U.S. Pat. No. 5,635,211, which is incorporated herein by reference in its entirety.

A preferred microencapsulation method in the context of the present invention involves an interfacial polymerization employing an oil-in-water emulsion. Interfacial polymerization (IFP) is characterized by wall formation via the rapid polymerization of monomers at the surface of the droplets or particles of dispersed core material. A multifunctional monomer is dissolved in the core material, and this solution is dispersed in an aqueous phase. A reactant to the monomer is added to the aqueous phase, and polymerization quickly ensues at the surfaces of the core droplets, forming the capsule walls.

The cross-linked polymer shell may be comprised of any suitable polymer known in the art, such as polyurea, polyurethane, polyamine, or other cross-linked polymers known in the art. In an exemplary embodiment, the cross-linked polymer shell is formed of a polyurea shell. Microcapsules having walls made of polyurea may be prepared by a two-phase polyaddition process. To this end, an oil phase containing an organic water-immiscible inert solvent, a first prepolymer, such as an isocyanate, and the material to be encapsulated (namely, the color former) is emulsified in an aqueous phase containing water and, if desired, additives such as emulsifiers, stabilizers and/or materials for preventing coalescence. For example, a suitable emulsion stabilizer may include polyvinyl alcohol. The addition of a second prepolymer, such as a polyamine or an amino alcohol, to this emulsion initiates a polyaddition reaction of amino and/or hydroxyl groups with isocyanate groups at the interface between oil droplets and water phase. As a result thereof, the oil droplets are enveloped by a polyurea or polyurea/polyurethane wall. This gives a dispersion of microcapsules containing the material to be encapsulated and the organic solvent. The size of the microcapsules is approximately equal to the size of the emulsified oil droplets.

As used herein, the term "prepolymer" refers to a chemical component that is capable of reacting with at least one other prepolymer or another of its kind as to enable formation of the polymer. In the case of polyurea containing microcapsule shells, at least one first prepolymer may be selected from the group consisting of an isocyanate, a diisocyanate, a polyisocyanate, and mixtures thereof. According to an embodiment of the present invention, at least one first prepolymer is a C8-20 bis-isocyanate. Specific but non-limiting examples of such bis-isocyanates include isophorone diisocyanate (IPDI), hexamethylene diisocyanate (HDI), toluene diisocyanate (TDI), methylene-bis-(4-cyclohexylisocynate) (HMDI), xylene diisocyanate (XDI), methylene diphenyl diisocynate (MDI), and mixtures thereof.

The second prepolymer may also be referred to herein as a "cross linker." Suitable cross linkers may include amines, such as aliphatic primary, secondary, or tertiary amines including, but not limited to, 1,2-ethylene diamine, bis-(3-aminopropyl)-amine, hydrazine, hydrazine-2-ethanol, bis-(2-methylaminoethyl)-methyl amine, 1,4-diaminocyclohexane, 3-amino-1-methylaminopropane, N-hydroxyethyl ethylene diamine, N-methyl-bis-(3-aminopropyl)-amine, 1,4-diamino-n-butane, 1,6-diamino-n-hexane, 1,2-ethylene diamine-N-ethane sulphonic acid (in the form of an alkali metal salt), 1-aminoethyl-1,2-ethylene diamine, bis-(N,N'-aminoethyl)-1,2-ethylene diamine, and diethylenetriamine. Hydrazine and its salts are also regarded as diamines in the present context.

Other suitable amines for use as the second prepolymer may include guanidine compounds wherein the guanidine compounds have at least two functional groups. Examples of guanidine compounds which are suitable for preparing the microcapsules may include those of the formula (I):

(formula I)

in which X represents HN=,

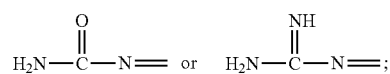

and
Y represents H—, NC—, $H_2N$—, HO—,

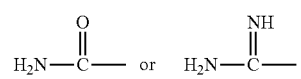

and salts thereof with acids.

For example, the salts can be salts of carbonic acid, nitric acid, sulphuric acid, hydrochloric acid, silicic acid, phosphoric acid, formic acid and/or acetic acid. Salts of guanidine compounds of the formula (I) can be used in combination with inorganic bases in order to obtain the free guanidine compounds of the formula (I) in situ from the salts. Examples of inorganic bases which are suitable for this purpose are alkali metal hydroxides and/or alkaline earth metal hydroxides and/or alkaline earth metal oxides. Preference is given to aqueous solutions or slurries of these bases, in particular to aqueous sodium hydroxide solution, aqueous potassium hydroxide solution and aqueous solutions or slurries of calcium hydroxide. Combinations of a plurality of bases can also be used.

The microcapsules can be produced by continuous and batchwise methods. The continuous procedure can be such, for example, that an emulsion of the desired type and oil droplet size is produced continuously in an emulsifying machine by the flow-through method. This can be followed by continuous addition of an aqueous solution of the amine in a downstream reaction vessel. The batchwise procedure can be such, for example, that the aqueous amine solution is added to an emulsion containing oil droplets having approximately the size of the desired microcapsules at the desired temperature in such an amount as is required stoichiometrically for the reaction of all isocyanate groups present in the oil phase.

Once formed, the microcapsules include the core completely surrounded by the polymer shell. The core may be comprised of at least one color former dissolved in a carrier oil. The color former may include leuco dyes, for example. The term "leuco dye" is used herein to refer to a color forming substance that is colorless or colored in a non-activated state and produces or changes color in an activated state. The terms "developer" or "activator" refer to substances that react with the leuco dye and cause the dye to alter its chemical structure and change or acquire color.

The leuco dyes may include any conventional leuco dyes known in the art. For example, suitable leuco dyes may include, but are not limited to, triphenylmethanephthalide leuco compounds, triallylmethane leuco compounds, fluoran leuco compounds, phenothiazine leuco compounds, thiofluoran leuco compounds, xanthene leuco compounds, indophthalyl leuco compounds, spiropyran leuco compounds, azaphthalide leuco compounds, couromeno-pyrazole leuco compounds, methine leuco compounds, rhodamineanilinolactam leuco compounds, rhodaminelactam leuco compounds, quinazoline leuco compounds, diazaxanthene leuco compounds, and bislactone leuco compounds. Fluoran compounds, and in particular, aminofluorane compounds, may be particularly preferred.

The leuco dyes may be activated to change to any color known to those skilled in the art. In particular, leuco dyes which react to form black dyes, yellow dyes, orange dyes, brown dyes, red dyes, purple dyes, blue dyes, green dyes, fluorescent dyes, and the like may be selected. In an exemplary embodiment, an leuco dye, which reacts to form an orange color, is used to distinguish from the other colors typically used or printed on a document, such as a check.

The leuco dye is preferably dissolved and dispersed in the carrier oil. The carrier oil may include oils, such as mineral oil, baby oil, vegetable oils, avocado oil, jojoba oil, borage oil, canola oil, castor oil, chamomile, coconut oil, corn oil, cottonseed oil, evening primrose oil, safflower oil, sunflower oil, soybean oil, sweet almond, lanolin, partially hydrogenated vegetable oils, and the like. In an exemplary embodiment, the carrier oil includes a vegetable oil, a soybean oil, or a mixture thereof. For example, the carrier oil may include a methylated soybean oil.

The core may include other ingredients, which may be present due to the microencapsulation process used, such additives include emulsifiers, stabilizers and/or materials for preventing coalescence. The core may also include other additives, which may be useful in enhancing the performance of the color former, its dispersability, its coating performance or transport on the document, or the like. The core may also include other additives, which influence other properties of the ink, such as scent, odor, color, and the like.

The microcapsules are preferably of a size and thickness designed to remain intact under the normal handling and wear of the document (e.g., writing on the face of the document, printing on the document, etc.), but able to easily rupture when a force is applied to the microcapsules. For example, the microcapsules may have a diameter of about 2-8 microns, 3-7 microns, 4-6 microns, and in particular, about 5 microns. The wall thickness of the microcapsules may be greater than about 60 nanometers, which may be suitable to exhibit a sufficient rupture strength to allow for the microcapsules to remain intact during writing, printing and normal handling, but which rupture when a severe force, such as scraping by a knife, is applied to the document. In particular, a sufficient rupture strength may be exhibited when the wall thickness of the microcapsules ranges from about 60-150 nanometers, about 70-140 nanometers, about 80-130 nanometers, about 90-130 nanometers, about 100-130 nanometers, and particularly, about 110-120 nanometers.

The microcapsules may be present in the tamper evident ink composition in any suitable amount necessary to provide for uniform and adequate coverage of the microcapsules once printed on the tamper evident document. For example, the tamper evident ink may contain about 1-50% by weight, about 5-40% by weight, about 10-30% by weight, about 15-25% by weight, and more particularly, about 18-22% by weight of the microcapsules.

(ii) Developer Particles

The second part of the tamper evident ink includes developer particles, which are capable of reacting with the color former, housed within the cores of the microcapsules, to cause a change or acquisition of color. The developer particles may include any chemical developers capable of reacting with the color former contained inside the microcapsules to produce a color image.

The developer particles can be selected from among conventional developers known in the art including acid clay, active clay, attapulgite, etc.; organic acids such as tannic acid, gallic acid, propylgallate; aromatic carboxylic acids such as benzoic acid, p-tert-butyl-benzoic acid, 4-methyl-3-nitrobenzoic acid, salicylic acid, 3-phenyl salicylic acid, 3-cyclohexyl salicylic acid, 3-tert-butyl-5-methyl salicylic acid, 3,5-ditert-butyl salicylic acid, 3-methyl-5-benzyl salicylic acid, 3-phenyl-5-($\alpha,\alpha$-dimethylbenzyl)salicylic acid, 3-cyclohexyl-5-($\alpha,\alpha$-dimethylbenzyl)salicylic acid, 3-($\alpha,\alpha$-dimethylbenzyl)-5-methyl salicylic acid, 3,5-dicyclohexyl salicylic acid, 3,5-di-($\alpha$-methylbenzyl)salicylic acid, 3,5-di-($\alpha,\alpha$-dimethylbenzyl)salicylic acid, 3-($\alpha$-methylbenzyl)-5-($\alpha,\alpha$-dimethylbenzyl)salicylic acid, 4-methyl-5-cyclohexyl salicylic acid, 2-hydroxy-1-benzyl-3-naphthoic acid, 1-benzoyl-2-hydroxy-3-naphthoic acid, 3-hydroxy-5-cyclohexyl-2-naphthoic acid and the like, and polyvalent metallic salts thereof such as zinc salts, aluminum salts, magnesium salts, calcium salts and cobalt salts; phenol compounds such as 6,6'-methylene-bis(4-chloro-m-cresol); acid polymers such as maleic acid-rosin resin and copolymers of maleic anhydride with styrene, ethylene or vinylmethylether; and aromatic carboxylic acid-aldehyde polymers, aromatic carboxylic acid-acetylene polymers and their polyvalent metallic salts.

Preferred developer materials are phenolic resins, such as phenol-aldehyde resins (e.g., p-phenyl-pjienolformaldehyde resin); phenol-acetylene resins, (e.g., p-tert-butyl-phenoi-acetylene resin); polyvalent metallic salts thereof such as zinc modified phenol formaldehyde resin as disclosed in U.S. Pat. No. 3,732,120, and phenolic resins modified to include amounts of unsubstituted or substituted salicylic acids in a manner known in the art. The developer materials may include phenol-formaldehyde condensation products, alkylphenolic resins, and metallated products of alkylphenolic resins. The alkyl phenols may be monosubstituted by an alkyl group which may contain 1 to 12 carbon atoms. Examples of alkyl phenols are ortho- or para-substituted ethylphenol, propylphenol, butylphenol, amyl-phenol, hexylphenol, heptylphenol, octylphenol, nonylphenol, t-butylphenol, t-octylphenol, etc. Another class of developer materials include a resin-like condensation product of a polyvalent metal salt, such as a zinc salt, and a phenol, a phenol-formaldehyde condensation product, or a phenol-salicylic acid-formaldehyde condensation product. For example, the developer material may include a zinc salicylate. In an exemplary embodiment, the developer particles include a phenolic resin, such as a zincated phenolic resin.

The developer particles are preferably in a particulate form. The term "particle" is to be broadly interpreted to encompass those of various shapes, sizes, and/or textures which can include those that may have varying degrees of irregularities, disuniformities, etc. or which may possess regular and/or uniform properties. The developer particles are preferably smaller in size then the microcapsules. For example, the diameter of the developer particles may be about 2 microns or less (e.g., about 0.01-2 microns or about 0.05-1.0 micron).

The developer particles may be present in the tamper evident ink composition in any suitable amount necessary to provide for uniform and adequate coverage of the developer particles once printed on the tamper evident document. For example, the tamper evident ink may contain about 1-50% by weight, about 5-40% by weight, about 10-30% by weight, about 15-20% by weight, and more particularly, about 16-19% by weight of the developer particles.

(c) Other Ink Constituents

The tamper evident ink may further include other ink constituents. The tamper evident ink may be colorless or colored, but is preferably colorless when applied to the document, such as a check, and so long as the at least one color former is not in contact with the developer particles. Other constituents may include, for example, oils, flow enhancers, resins, and the like. In particular, the tamper evident ink may include oils, such as mineral oil, baby oil, vegetable oils, avocado oil, jojoba oil, borage oil, canola oil, castor oil, chamomile, coconut oil, corn oil, cottonseed oil, evening primrose oil, safflower oil, sunflower oil, soybean oil, sweet almond, lanolin, partially hydrogenated vegetable oils, and the like. In an exemplary embodiment, the oil includes a mineral oil. If present, the ink composition may include 1-50% by weight, about 5-40% by weight, about 20-30% by weight, or about 23-27% by weight of the oil. The tamper evident ink may also include resins, such as ester resins, maleic-modified rosin, or the like. If present, the ink composition may include 1-60% by weight, about 5-50% by weight, about 20-40% by weight, or about 25-35% by weight of the resin. Other additives, such as flow enhancers, emulsion stabilizers, and the like may be added in suitable amounts known in the art. If present, such additives may include less than about 10% by weight, less than 5% by weight, or less than 1% by weight.

(d) Preparing the Tamper Evident Ink

The tamper evident ink or self-contained carbonless printing ink may be produced using any suitable techniques and equipment known in the art. In one embodiment, the self-contained carbonless printing ink may be produced from a water-in-oil emulsion. The water-in-oil emulsion may include an aqueous capsule slurry dispersed into an oil base printing vehicle containing the developer. The developer is preferably incorporated into the oil base under standard mixing conditions. The aqueous microcapsules may then be mixed with the prepared oil base under high shear to form the water-in-oil emulsion. The high shear mixing may be accomplished using any suitable equipment, such as a Cowles mixer, and the revolution per minute (rpm) may be adjusted to be about 1500-4000 rpm, for example. A preferred water-in-oil emulsion procedure is disclosed in U.S. Pat. No. 6,042,641, which is incorporated herein by reference in its entirety.

The percent solids and content of oil, active developer, and capsules may be of a suitable amount to obtain the desired ink composition. In one embodiment, the microcapsule slurry preferably contains at least 40% solids. In particular, the microcapsule slurry may contain about 40-80% solids, preferably, about 40-60% solids, more preferably, about 46-50% solids, and most preferably, about 48% solids. The ink vehicle preferably contains no more than 25% oil. In particular, the ink vehicle may contain about 10-25% oil, preferably, about 15-25% oil, more preferably, about 20-24% oil, and most preferably, about 22% oil. The total active developer used can vary between about 10% to about 18%, preferably being at about 14%, and the total active capsule content can vary between about 10% to about 20%, preferably being at about 15%. In one embodiment, the resulting printing ink has a viscosity greater than about 50,000 cps, preferably greater than about 75,000 cps, and most preferably at or higher than about 100,000 cps. A high viscosity may be desirable for dry offset printing as used on a conventional forms press.

Tamper Evident Document

The present invention provides for a tamper evident document, which uses a tamper evident ink applied to the face of the document. According to one embodiment, the present invention provides a tamper evident document including a paper substrate having a face for providing information, and a tamper evident ink applied on the face of the paper substrate.

The paper substrate may include any paper or paperboard known the art. The paper may include an amalgamation of fibers that can include, at least in part, vegetable, wood, and/or synthetic fibers. As appreciated, any known components can be included in the paper substrate (e.g., whiteners, brighteners, colorants, surface size agents, starch, binders, fillers) and may be formed of any suitable thickness, stiffness, strength, and/or weight needed for the particular application of the document (e.g., check stock is usually 24 lb. basis weight compared to plain papers which are commonly 20 lb. basis weight).

The tamper evident ink is preferably applied to the face of the substrate. As used herein, the "face" of the document is intended to encompass the surface of the document which will contain information. In other words, the tamper evident ink is not applied to the back of the substrate or a separate paper substrate. Thus, the tamper evident ink is effective to indicate alteration or tampering on the face of the document where the information resides.

Figure 2:
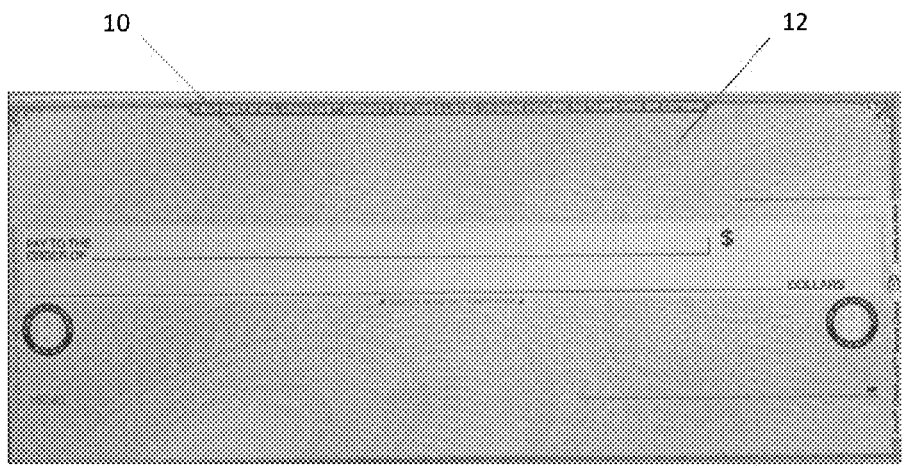
FIG. 2 depicts a typical or standard check.

FIG. 2 depicts a typical check 12 printed on a paper substrate 10. The tamper evident ink should be applied on the document (e.g., check 12) at least in the locations where variable or sensitive information resides (depicted as the area beneath box 14 in FIG. 3). The tamper evident ink may penetrate or embed into the surface of the paper substrate 10 or may exist as a coating only on the surface of the paper substrate 10.

Figure 4:
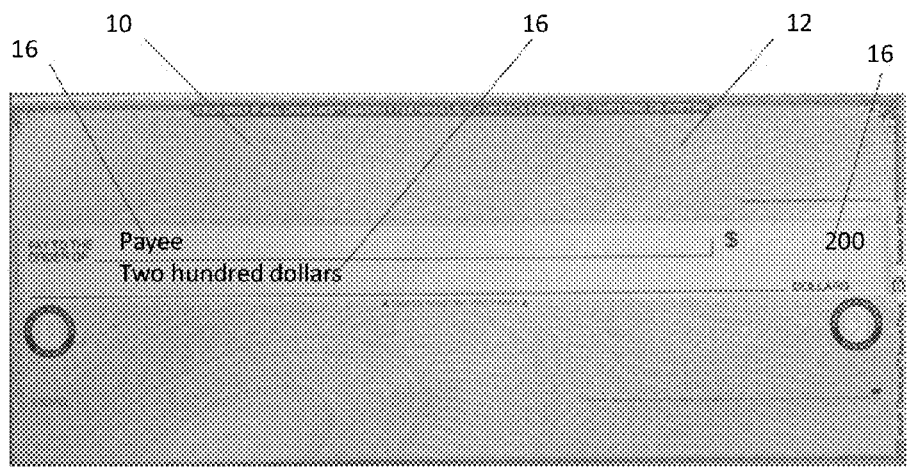
FIG. 4 shows the check where the variable or sensitive information including the payee and the amount has been added to the check after the tamper evident ink has been applied.

The variable or sensitive information 16, shown in FIG. 4, is intended to encompass information, which is likely to be altered or modified by an ill-intentioned individual. In the case of the check 12, the variable information typically includes the name of the payee, amount of the check, signature, and date. The sensitive information is typically the name of the payee and the amount of the check. The face of the substrate may include a pre-printed document, such as a traditional pre-printed check 12, which already includes locations for the payee, dollar amount, etc. (see FIG. 2). In the case of other documents, such as lottery tickets there may not be any variable information, but the information is sensitive in that it identifies a value for the document (e.g., the winning amount of a lottery ticket).

According to one embodiment, a process of preparing a tamper evident document includes (a) providing a paper substrate having a face for providing information; and (b) applying a tamper evident ink on the face of the paper substrate, the tamper evident ink comprising: (i) microcapsules having a cross-linked polymer shell and a core surrounded by the shell, wherein the core comprises at least one color former dissolved in a carrier oil; and (ii) developer particles.

As shown in FIG. 1, depicting a scanning electron microscope (SEM) image at 1000× magnification, the microcapsules 20 and the developer particles 26, which are dispersed in the tamper evident ink, is applied to the paper substrate 10. The microcapsules 20 and the developer particles 26 may be uniformly and evenly coated on the surface of the paper substrate 10. The tamper evident ink may be applied to the entire face of the paper substrate 10 or may be applied to only the portions of the paper substrate 10 which will contain variable or sensitive information 16. In the case of a standard check 12, shown in FIG. 2, the locations near and surrounding the name or amount of the check 12 shown by the area encompassed by box 14 in FIG. 3 would contain the variable or sensitive information 16. As shown in FIG. 4, the variable or sensitive information 16 may be later printed on the face of the paper substrate 10 (e.g., by a bank teller) in the places where the tamper evident ink has already previously been printed.

The tamper evident ink may be applied to the face of the paper substrate using any suitable techniques and equipment known in the art. For example, the tamper evident ink may be applied by coating or printing the tamper evident ink onto the face of the paper substrate. The coating or printing may be performed by a process, such as flexographic, gravure, stamping, tint unit, lithographic, wet or dry offset printing, or the like. In an exemplary embodiment, the tamper evident ink is applied by dry offset printing. The subsequent printing of the information, such as the variable or sensitive information, may also be applied using any suitable printing techniques and equipment known in the art, such as laser printing, ink jet printing, dry toner printer, offset printing, etc.

Figure 5:
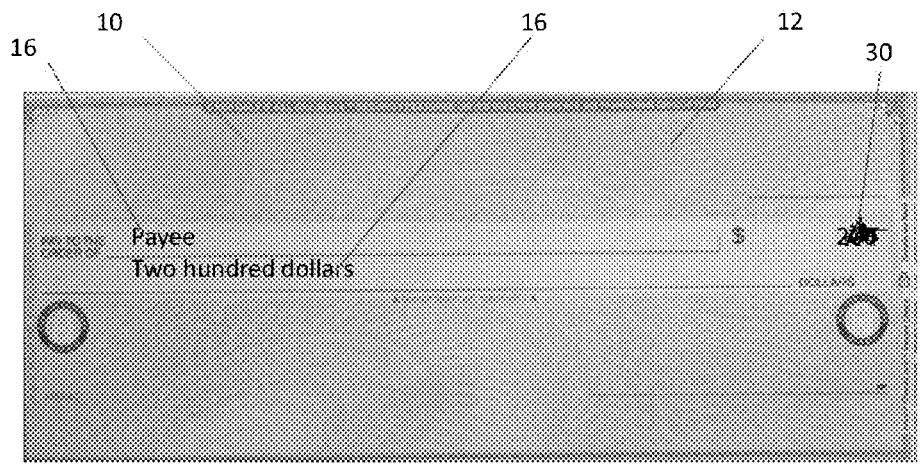
FIG. 5 shows the check has been tampered with and a mark has developed in the area where the tampering occurred.
Figure 6:
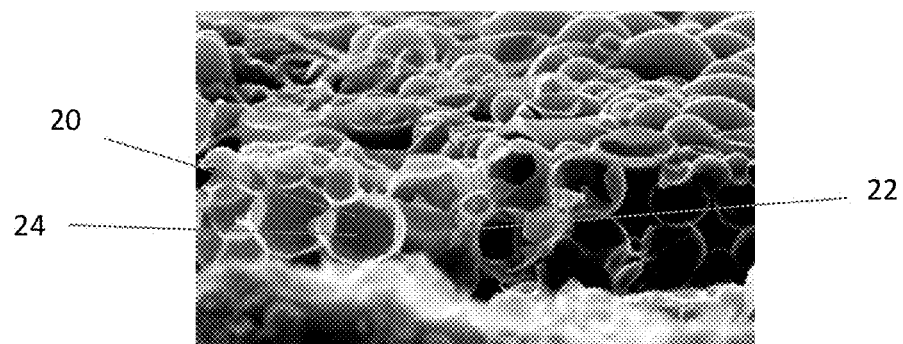
FIG. 6 is an image of carbonless capsules, but is illustrative of the concept of broken microcapsules, which would rupture due to tampering of the check.

If information on the tamper evident document is altered by force or pressure (e.g., by scraping toner or ink with a knife), a visual indication of tampering is revealed on the face of the document. The visual indication of tampering may include the appearance of color, such as an orange color, or a color change. As shown in FIG. 5, for check 12, evidence of tampering is shown by mark 30 as a colored, permanent, and irreversible image near or at where the tampering occurred. In this case, the mark 30 is indicative of tampering to the amount value. As the concept is illustrated in FIG. 6, the shell 22 of the microcapsules 20 ruptures releasing the contents of the core 24 contained therein. Thus, the core 24 of the microcapsules 20 is released, the carrier oil flows, and the color former previously contained in the core 24 is able to react with the developer particles 26 on the surface of the paper substrate 10.

If the information is not tampered with (e.g., the document is merely subjected to standard handling and printing), then there is no indication of any type of tampering with the document (e.g., the document remains unchanged, for example, the check 12 of FIG. 4 remains unchanged). In other words, the color former and developer react only if the microcapsules rupture and the color former is exposed to the developer. The tamper evident document also requires a relatively high amount of pressure (e.g., the pressure from a knife scraping off the printed subject matter) to cause the mark to develop or appear relative to the small degree of pressure (e.g., caused by writing with a pen) needed in carbonless paper technology. Also, unlike carbonless paper, the tamper evident document only requires a single paper substrate. In other words, the tamper evident document does not use or require two separate sheets or multiple sheets of paper.

The tamper evident document may be suitable for any security documents where there is a possibility or likelihood of alteration or forgery of the document. In particular, documents, which if altered, would severely undermine or negate the value of the document may be of particular concern. As illustrative examples, documents of particular concern and susceptible to forgery or alteration include, but are not limited to, checks, bank notes, lottery tickets, passports, gaming and casino documents, sports cards, tickets, and the like.

Figure 7:
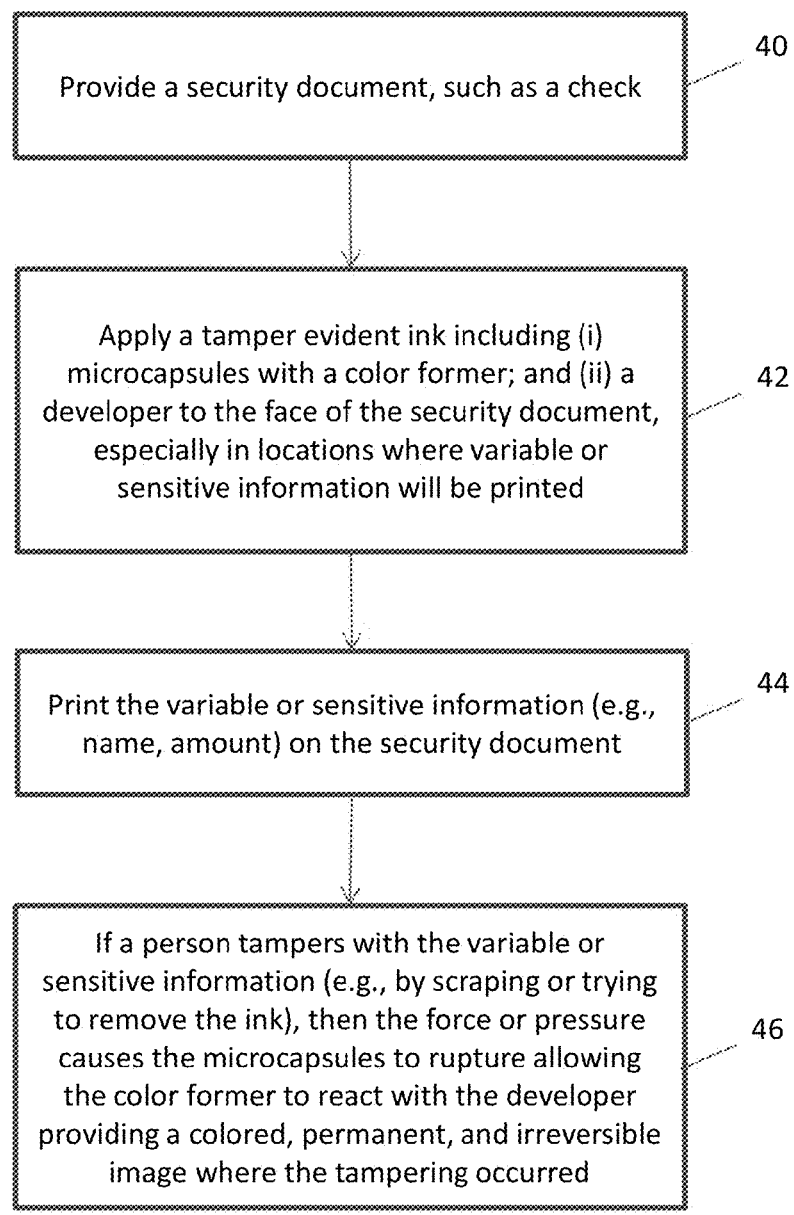
FIG. 7 provides steps to create and use a tamper evident document.

FIG. 7 depicts the steps in preparing the tamper evident document, such as a check, and use of the tamper evident document, for example, in commerce. The first step 40 includes providing a security document, such as a check. The check may be created or obtained, from a check publisher, bank, or other traditional institution. The second step 42 includes applying the tamper evident ink to the face of the security document, especially in locations where the variable or sensitive information will be printed. This step could be an independent printing step, for example, or may be incorporated in the process of producing the checks in the first instance. The third step 44 includes printing the variable or sensitive information on the security document. For example, a bank teller may print a check with the payees name and amount. The fourth step 46 occurs if a person tampers with the information on the security document. For example, if a person or machine attempts to scrape off or remove the information on the face of the document, then the microcapsules rupture allowing the color former to react with the developer and providing a colored, permanent, and irreversible image near or at where the tampering occurred.

EXAMPLE

The invention is further defined by reference to the following example, which is intended to be illustrative and not limiting. A tamper evident ink was prepared according to the following method. First, microcapsules having walls made of polyurea were prepared by a two-phase polyaddition process using the ingredients identified in Table 1.

TABLE 1

| Material | % by weight |
| --- | --- |
| Polyvinyl alcohol (PVA) | 1.1 |
| Poly-isocyanate | 14.5 |
| Guanadine carbonate | 8.0 |
| Soy oil | 71.0 |
| Color formers (combination of two leuco dyes) | 5.4 |

After the microcapsules were formed, they were incorporated with an ink composition including the ingredients identified in Table 2.

TABLE 2

| Material | % by weight |
| --- | --- |
| Polyurea microcapsules | 19.2 |
| Synthetic ester resin | 29.3 |
| Mineral oil | 25.9 |
| Developer particles (zinc phenolic resin) | 17.6 |
| Other additives including flow enhancer | 8.0 |

The self-contained carbonless printing ink was produced from a water-in-oil emulsion consisting of an aqueous capsule slurry dispersed into an oil base printing vehicle containing the developer. Adjustments were made to the capsule wall thickness during its manufacture to achieve final desired breakage properties. The microcapsule slurry was formed to be at least 40% solids, and the ink vehicle contained no more than 25% oil. In the preferred example, the microcapsule slurry contained 48% solids and the ink vehicle 22% oil. The developer was incorporated into the oil base under standard mixing. The aqueous microcapsules were then mixed with the prepared oil base under high shear to form a water-in-oil emulsion. Total active developer used can vary between 10% to 18%, preferably being at 14%. The total active capsule content can vary between 10% to 20%, preferably being at 15%. The resulting printing ink had a viscosity greater than 50,000 cps. In a preferred example, the resulting printing ink had a viscosity at or higher than 100,000 cps. This viscosity is desirable for dry offset printing as used on a conventional forms press.

Figure 3:
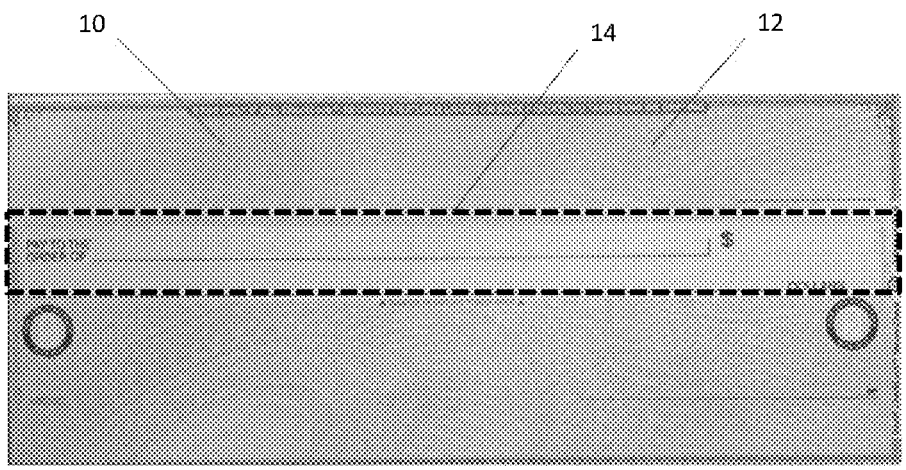
FIG. 3 depicts the area on the check where the variable or sensitive information is typically provided and where the tamper evident ink was applied.

The ink produced was applied to a pre-printed check using a dry offset printing technique to produce the check, as shown in FIG. 3. When the force of a knife was applied to scrape the surface of the check, a permanent and colored mark appeared. When the check was subjected to normal wear and handling, the microcapsules remained intact and were undetectable with the naked eye.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges. In addition, features of one embodiment may be incorporated into another embodiment.

What is claimed is:

1. A tamper evident document comprising:
   a paper substrate having a surface for providing information; and
   a tamper evident ink on at least a portion of said surface, the ink being in water-in-oil emulsion form having a water phase dispersed in an oil phase;
   wherein the water phase contains microcapsules having a cross-linked polymer shell and a core surrounded by the shell, the core comprising at least one color former dissolved in a carrier oil; and
   wherein the oil phase contains developer particles.

2. The tamper evident document of claim 1, wherein the cross-linked polymer shell comprises polyurea.

3. The tamper evident document of claim 1, wherein the microcapsules have a diameter of about 2-8 microns.

4. The tamper evident document of claim 3, wherein the developer particles have a diameter of 0.01 to 2 microns.

5. The tamper evident document of claim 1, wherein the microcapsules have a wall thickness of 110-120 nanometers.

6. The tamper evident document of claim 1, wherein the at least one color former comprises at least one leuco dye.

7. The tamper evident document of claim 1, wherein the carrier oil comprises vegetable oil, soybean oil, or mixtures thereof.

8. The tamper evident document of claim 1, wherein the developer particles comprise zinc.

9. The tamper evident document of claim 1, wherein the tamper evident ink comprises:
   15-25% by weight of the microcapsules; and
   15-20% by weight of the developer particles.

10. The tamper evident document of claim 1, wherein the tamper evident ink further comprises:
    20-40% by weight ester resin; and
    20-30% by weight oil.

11. The tamper evident document of claim 1, wherein the tamper evident ink is colorless so long as the at least one color former is not in contact with the developer particles.

12. The tamper evident document of claim 1, wherein if the information is altered by force or pressure, the microcapsules rupture and the at least one color former reacts with the developer particles to provide a visual indication of tampering.

13. The tamper evident document of claim 12, wherein the visual indication is a color change or appearance of color where the force or pressure was applied.

14. The tamper evident document of claim 1, wherein the tamper evident document is a security document selected from the group consisting of a check, lottery ticket, passport, gaming document, and casino document.

15. A process of preparing a tamper evident document comprising:
    applying a tamper evident ink on a surface of the document, the tamper evident ink being in emulsion form and having a water phase dispersed in an oil phase;
    wherein the water phase contains microcapsules having a cross-linked polymer shell and a core surrounded by the shell, the core comprising at least one color former dissolved in a carrier oil; and
    wherein the oil phase contains developer particles.

16. The process of claim 15, wherein the tamper evident ink is applied to portions of the surface which will contain variable or sensitive information.

17. The process of claim 16 further comprising printing the variable or sensitive information on the surface.

18. The process of claim 15, wherein the tamper evident ink is applied by coating or printing the tamper evident ink on the surface.

19. The process of claim 18, wherein the tamper evident ink is applied by dry offset printing.

20. The process of claim 15, wherein the tamper evident ink comprises an aqueous microcapsule slurry dispersed in an oil phase containing the developer particles.

21. The process of claim 20, wherein the microcapsules are prepared by polymerizing at least one of hexamethylene diisocyanate and methylene diphenyl diisocyanate with a guanidine carbonate cross linker.

22. A tamper evident ink comprising:
a water in oil emulsion having a water phase dispersed in an oil phase;
the water phase further comprising 15-25% by weight microcapsules having a cross-linked polyurea shell and a core surrounded by the shell, wherein the core comprises at least one color former dissolved in a carrier oil;
the oil phase comprising 15-20% by weight developer particles, 20-40% by weight ester resin, and 20-30% by weight oil.

23. The tamper evident ink of claim 22, wherein the microcapsules have a wall thickness of 110-120 nanometers.

24. The tamper evident ink of claim 22, wherein the microcapsule shells comprise a diisocyanate selected from the group consisting of hexamethylene diisocyanate, methylene diphenyl diisocyanate, and mixtures thereof, and a guanidine carbonate cross linker.

* * * * *